Figure 1:
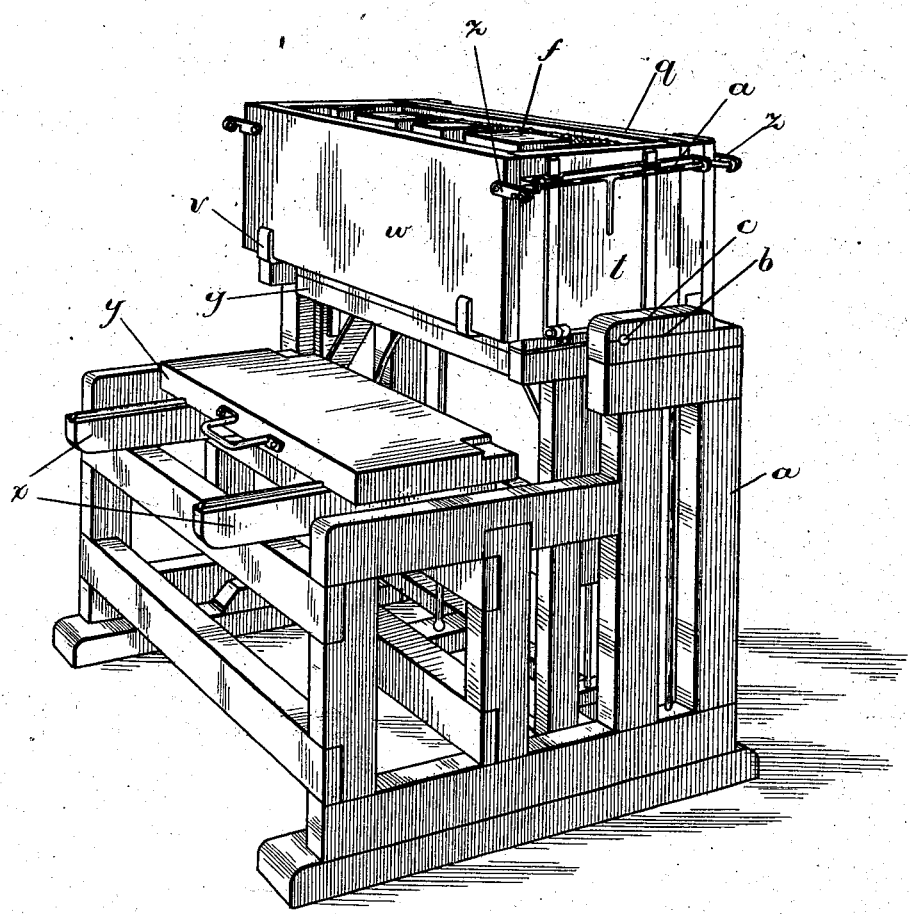

No. 730,212. PATENTED JUNE 2, 1903.
C. H. HUTCHINGS.
MACHINE FOR MOLDING BUILDING BLOCKS OR ARTIFICIAL STONE.
APPLICATION FILED FEB. 10, 1903.
NO MODEL. 4 SHEETS—SHEET 1.

Witnesses.
L. F. Birch.
F. B. Jorman

Inventor.
C. H. Hutchings
by C. N. Riches
his attorney

No. 730,212. PATENTED JUNE 2, 1903.
C. H. HUTCHINGS.
MACHINE FOR MOLDING BUILDING BLOCKS OR ARTIFICIAL STONE.
APPLICATION FILED FEB. 10, 1903.
NO MODEL. 4 SHEETS—SHEET 2.

Witnesses.

Inventor.

No. 730,212. PATENTED JUNE 2, 1903.
C. H. HUTCHINGS.
MACHINE FOR MOLDING BUILDING BLOCKS OR ARTIFICIAL STONE.
APPLICATION FILED FEB. 10, 1903.
NO MODEL. 4 SHEETS—SHEET 3.

No. 730,212. PATENTED JUNE 2, 1903.
C. H. HUTCHINGS.
MACHINE FOR MOLDING BUILDING BLOCKS OR ARTIFICIAL STONE.
APPLICATION FILED FEB. 10, 1903.
NO MODEL. 4 SHEETS—SHEET 4.

Witnesses. Inventor.

No. 730,212. Patented June 2, 1903.

UNITED STATES PATENT OFFICE.

CHARLES HENRY HUTCHINGS, OF TORONTO, CANADA, ASSIGNOR OF TWO-THIRDS TO PHILIP W. STANHOPE, OF TORONTO, CANADA.

MACHINE FOR MOLDING BUILDING-BLOCKS OR ARTIFICIAL STONE.

SPECIFICATION forming part of Letters Patent No. 730,212, dated June 2, 1903.

Application filed February 10, 1903. Serial No. 142,809. (No model.)

*To all whom it may concern:*

Be it known that I, CHARLES HENRY HUTCHINGS, of the city of Toronto, in the county of York and Province of Ontario, Canada, have invented certain new and useful Improvements in Machines for Molding Building-Blocks or Artificial Stone; and I hereby declare that the following is a full, clear, and exact description of the same.

This invention has reference to a novel apparatus for molding building-blocks or artificial stone made from a mixture of granular materials, such as cement and sand or other siliceous and cementing substances, mixed together in a substantially dry state prior to being placed in the mold-box; and it relates more particularly to the peculiar construction and operation of the mold-box whereby the building-block or artificial stone can be molded with a hollow core and grooved ends and easily removed from the mold-box without the slightest concussion which would disturb or disintegrate the homogenity of the molded mass. One of the most serious obstacles met with in the manufacture of building-blocks or artificial stone from a mixture of sand and cement is the liability of the molded block or stone to crumble away or shatter as a result of the slightest concussion during its removal from the mold-box, and to overcome this obstacle and to so construct the apparatus that the blocks or stones can be rapidly made and ornamented with any suitable design in imitation of cut or carved stone is the object of the present invention, which is attained by the peculiar construction and operation of the mold-box and the manner in which it is operated.

In carrying out the invention I journal the bottom of the mold-box in suitable bearings connected to or forming part of the main frame, in such a manner that the mold-box can be maintained in an upright position when the composition is being molded to the requisite shape and design and can thereafter be turned at right angles to the upright position and opened to permit of the removal of one of the mold-box sides and the molded block or stone on a carriage which forms a movable support for such removable side and the molded article supported thereon, as hereinafter more fully set forth, and more particularly pointed out in the claims.

Figure 2:
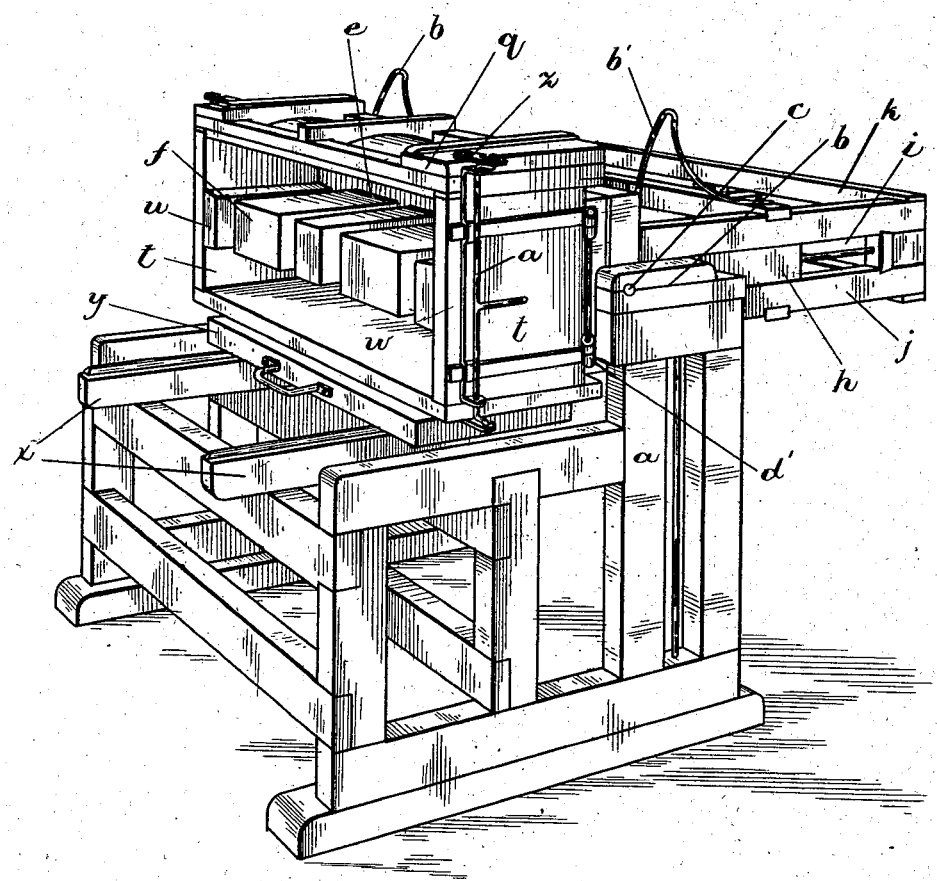
Figure 3:
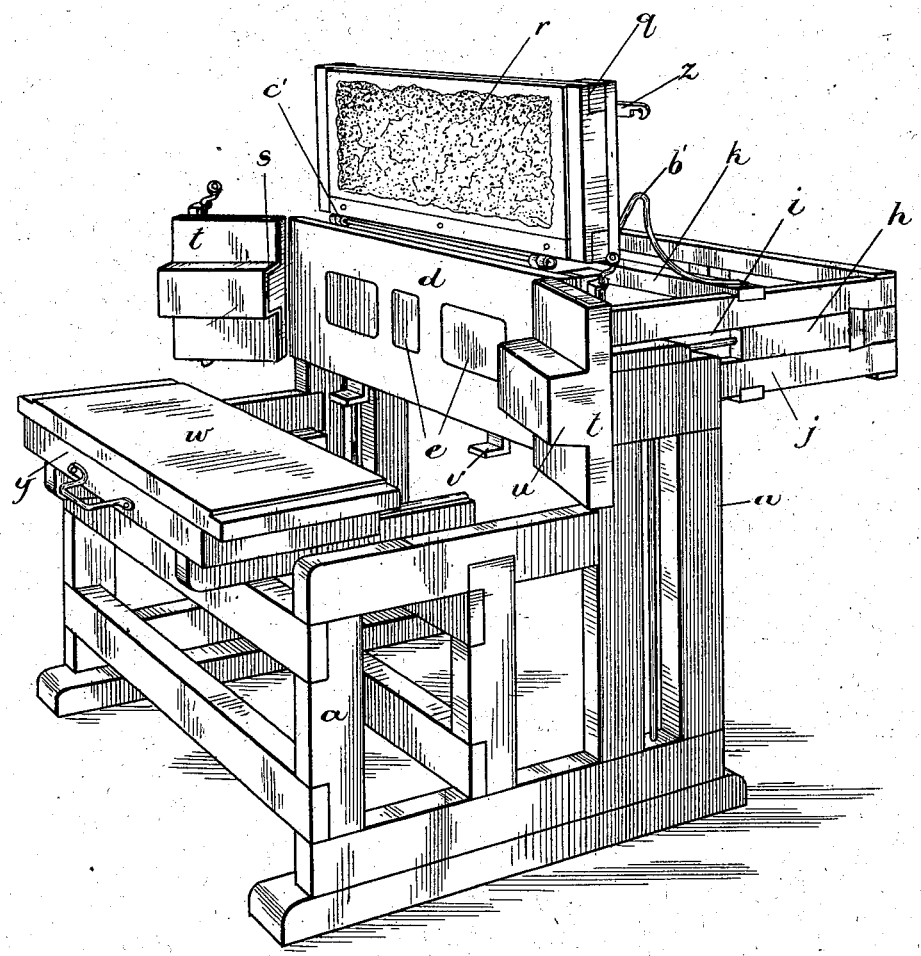
Figure 4:
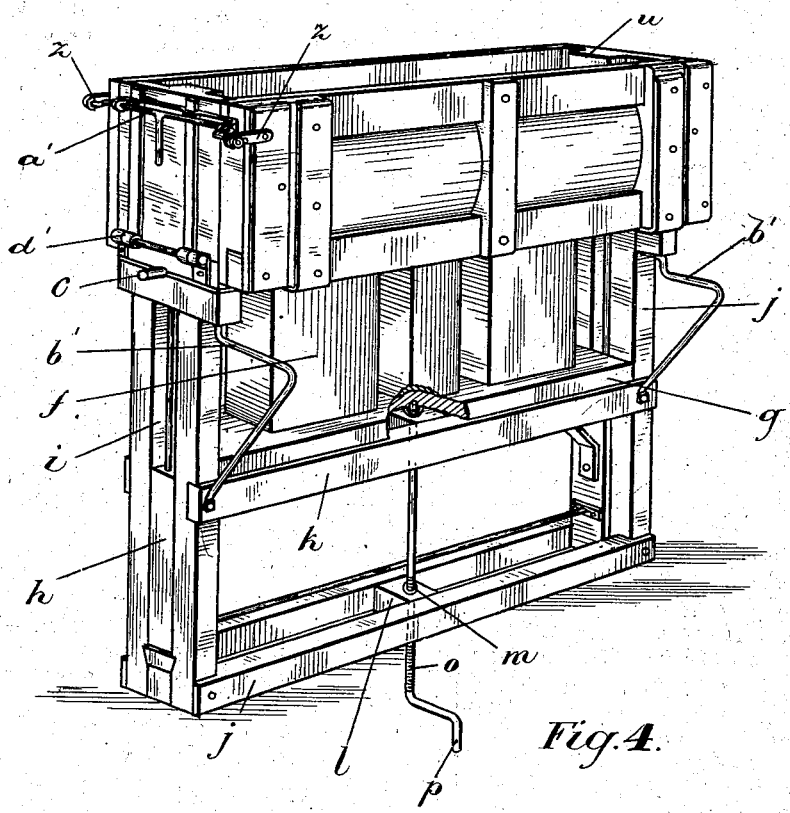
Figure 5:
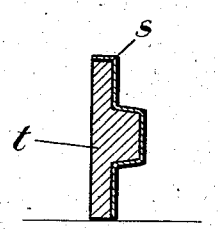
Figure 6:
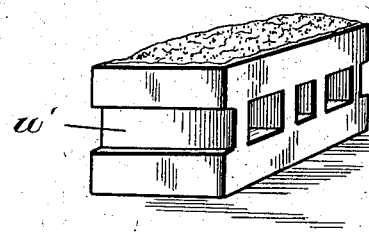

In the drawings, Figure 1 is a perspective view of the complete apparatus, showing the mold-box in an upright position to receive the granular mixture. Fig. 2 is a similar view to Fig. 1, showing the mold-box upset after the building-block or artificial stone has been molded and prior to the withdrawal of the removable core. Fig. 3 is a similar view to Fig. 2, showing the position of the core and of the sides and ends of the mold-box when opened to allow of the removal of the molded building-block or artificial stone. Fig. 4 is a perspective view of the mold-box, the removable core and its operating mechanism, and the adjacent part of the frame. Fig. 5 is a sectional view of one of the ends of the mold-box. Fig. 6 is a perspective view of a molded building block or stone.

Like letters of reference refer to like parts throughout the specification and drawings.

The top of the frame $a$, at the front thereof, is fitted with bearing-boxes $b$, in which are journaled the mandrels $c$ for the ends of the mold-box bottom $d$, and formed in the mold-box bottom $d$ are apertures $e$, through which move the removable core or cores $f$, integrally formed with or secured to a cross-head $g$, having guide-blocks $h$, movable in the guideways $i$, formed in the sides $j$ of a frame $h$, connected to the under side of the mold-box bottom $d$. Rigidly uniting the lower ends of the frame sides $j$ is an end piece or brace $l$, having a medially-located screw-threaded bore $m$, through which moves the operating-screw $o$ of the cross-head $g$, the free end of the operating-screw having a crank $p$, by means of which it is rotated to adjust the position of the cross-head and cores relatively to the mold-box. Hinged to the front of the mold-box bottom $d$ is the front side $q$, the inner face of which is fitted with a matrix $r$ for forming on the building-block or artificial stone an imprint of a pattern. This matrix $r$, together with the linings $s$ for the opposite side and the ends, is made from a non-corrosive metal in order that the granular particles will not adhere thereto and impair the sharpness of the outline and pattern of the molded block or stone. Hinged to the ends of the mold-box bottom $d$ are the end sides $t$ of the mold-box, having inward projections $u$ to form in the ends of the molded block or stone the end grooves $u'$, and projecting from the rear side of the mold-box bottom $d$ are outturned lugs $v$ to engage the lower end of the removable side $w$, which is used not only for the purpose of molding the adjacent side of the building block or stone, but is also employed as a follow-board, upon which the removable block or stone is withdrawn from the mold-box and permitted to set and harden.

Supported on the top of the frame $a$, in rear of the mold-box, are track-rails $x$, upon which is mounted a movable carriage $y$ to support the removable side $w$ when the mold-box has been turned into the position shown in Fig. 2 and withdraw the removable side $w$ and the molded building block or stone therefrom when the ends and front side of the mold-box have been opened into the position shown in Fig. 3. In molding the building block or stone the sides and ends of the mold-box are closed into the position shown in Fig. 4 of the drawings, the front and rear sides of the mold-box being fitted with pivoted latches $z$, which engage the cranked ends of the rock-shaft $a'$, connected to the end sides $t$ to rigidly lock the top of the front, rear, and end sides together. The granular substances—or, in other words, the mixture of sand and cement—are then placed in the mold-box and tamped or pressed to the requisite shape, the uppermost side of the block when the mold-box is in this position being then leveled off by a trowel or other tool.

When the block has been properly molded, the mold-box is turned into the position shown in Fig. 2, in which position the removable side engages and rests upon the carriage $y$. When the mold-box has been turned into this position, the removable core is withdrawn horizontally from the molded block or stone by the rotation of the operating-screw, and the rock-shafts $a'$ are then turned to disengage the cranked ends from the latches $z$, and the end and front sides are then opened into the position shown in Fig. 3, in which position the front side is supported by two arms $b'$, secured to the front of the side pieces $j$, to relieve the strain upon the hinges $c'$, connecting the front side to the bottom $d$. The hinges $d'$, connecting the end sides to the bottom $d$, are freed from all torsional strains when the mold-box has been turned into the position shown in Figs. 2 and 3, and consequently it is unnecessary to provide any auxiliary means for supporting the end sides when the mold-box is in this position.

Having thus fully described my invention, what I claim as new, and desire to secure by Letters Patent, is—

1. In a machine for molding building-blocks and artificial stone the combination of the main frame, a mold-box journaled therein consisting of a bottom side, two end sides and a front side connected to the bottom side, a removable side opposed to the front side and means for temporarily locking the sides together, substantially as specified.

2. In a machine for molding building-blocks and artificial stone, the combination of the main frame, a mold-box journaled therein, a removable side for the mold-box, and a carriage mounted on the main frame to engage and support the removable side when the mold-box is in its upset position, substantially as specified.

3. In a machine for molding building-blocks and artificial stone, the combination of a main frame, a mold-box journaled therein consisting of a bottom side, a front side and two end sides connected to the bottom side, a removable side opposed to the front side, means for temporarily locking the sides together and a carriage mounted on the main frame to engage and support the removable side when the mold-box is in its upset position, substantially as specified.

4. In a machine for molding building-blocks and artificial stone, the combination of a main frame, a mold-box journaled therein, a removable side for the mold-box, a removable core for the mold-box and a carriage mounted on the main frame to engage and support the removable side when the mold-box is in its upset position, substantially as specified.

5. In a machine for molding building-blocks and artificial stone, the combination of a main frame, a mold-box journaled therein consisting of a bottom side, a front side and two end sides connected to the bottom side, and a removable side opposed to the front side, and means for temporarily locking the sides together, a removable core for the mold-box and a carriage mounted on the main frame to engage and support the removable core when the mold-box is in its upset position, substantially as specified.

6. In a machine for molding building-blocks and artificial stone, the combination of a main frame, a mold-box journaled therein having an apertured bottom, a removable side for the mold-box, a removable core movable through the apertured bottom, means for operating said core and guiding its movement when moving through the apertured bottom and a movable carriage mounted on the main frame to engage the removable side when the mold-box is in its upset position, substantially as specified.

7. In a machine for molding building-blocks and artificial stone the combination of a main frame, a mold-box mounted therein having a removable side to be used as a follow-board for the molded material, and means for separating the removable side from the remaining sides of the mold-box, substantially as specified.

Toronto, January 9, A. D. 1903.

CHARLES HENRY HUTCHINGS.

In presence of—
C. H. RICHES,
F. B. JARMAN.